United States Patent
O'Brien et al.

(10) Patent No.: US 10,985,983 B2
(45) Date of Patent: Apr. 20, 2021

(54) METHOD AND SYSTEM FOR DYNAMICALLY CONFIGURING A CLIENT INSTALLED AND RUNNING ON A COMMUNICATION DEVICE

(71) Applicant: CounterPath Corporation, Vancouver (CA)

(72) Inventors: Jim O'Brien, East Weymouth, MA (US); Donovan Jones, Surrey (CA)

(73) Assignee: Counterpath Corporation, Vancouver (CA)

( * ) Notice: Subject to any disclaimer, the term of this patent is extended or adjusted under 35 U.S.C. 154(b) by 139 days.

(21) Appl. No.: 15/524,855

(22) PCT Filed: Nov. 7, 2014

(86) PCT No.: PCT/CA2014/000813
§ 371 (c)(1),
(2) Date: May 5, 2017

(87) PCT Pub. No.: WO2016/070259
PCT Pub. Date: May 12, 2016

(65) Prior Publication Data
US 2017/0339009 A1      Nov. 23, 2017

(51) Int. Cl.
*H04L 12/24* (2006.01)
*H04L 29/08* (2006.01)
(Continued)

(52) U.S. Cl.
CPC ........ *H04L 41/082* (2013.01); *H04L 41/0806* (2013.01); *H04L 67/26* (2013.01);
(Continued)

(58) Field of Classification Search
None
See application file for complete search history.

(56) References Cited

U.S. PATENT DOCUMENTS

| 6,779,004 B1 | 8/2004 | Zintel |
| 7,346,370 B2 | 3/2008 | Spaur et al. |

(Continued)

FOREIGN PATENT DOCUMENTS

| CN | 101237475 A | 8/2008 |
| EP | 2472817 A1 | 7/2012 |

OTHER PUBLICATIONS

European Patent Application No. 14905362.1, Supplementary European Search Report dated May 24, 2018.
(Continued)

*Primary Examiner* — James A Edwards
(74) *Attorney, Agent, or Firm* — Borden Ladner Gervais, LLP; Louis B. Allard

(57) ABSTRACT

The present disclosure relates to a computer-implemented method of dynamically configuring a client installed on a communication device. The method includes, at a server operationally connected to the client through a network, obtaining environment identification data identifying an environment in which the client operates; generating, as a function of the environment identification data and administrative constraints, a configuration for the client, and pushing, to the client, the generated configuration, the configuration for configuring identification data the client to operate in the environment.

27 Claims, 4 Drawing Sheets

(51) Int. Cl.
- *H04W 84/12* (2009.01)
- *H04L 29/12* (2006.01)
- *H04W 8/26* (2009.01)
- *H04W 4/80* (2018.01)
- *G01S 19/13* (2010.01)
- *H04L 29/06* (2006.01)

(52) U.S. Cl.
CPC .............. *H04L 67/34* (2013.01); *G01S 19/13* (2013.01); *H04L 41/12* (2013.01); *H04L 61/1511* (2013.01); *H04L 61/2007* (2013.01); *H04L 61/2514* (2013.01); *H04L 67/42* (2013.01); *H04W 4/80* (2018.02); *H04W 8/26* (2013.01); *H04W 84/12* (2013.01)

(56) References Cited

U.S. PATENT DOCUMENTS

| | | | |
|---|---|---|---|
| 7,895,257 | B2 | 2/2011 | Helal et al. |
| 7,987,241 | B2 | 7/2011 | St, Jr. et al. |
| 8,009,619 | B1 | 8/2011 | Clavel et al. |
| 8,055,747 | B2 | 11/2011 | Mazur et al. |
| 8,176,499 | B2 | 5/2012 | Morris et al. |
| 8,490,050 | B2 | 7/2013 | Crider et al. |
| 8,886,625 | B1* | 11/2014 | Dorner .................. G06F 16/435 707/706 |
| 8,972,171 | B1* | 3/2015 | Barth .................. G01C 21/3415 701/414 |
| 2003/0063120 | A1 | 4/2003 | Wong et al. |
| 2004/0132451 | A1* | 7/2004 | Butehorn ........... H04B 7/18584 455/445 |
| 2006/0005008 | A1* | 1/2006 | Kao .................... H04L 63/0272 713/153 |
| 2006/0129878 | A1* | 6/2006 | Soto ..................... G06F 11/142 714/6.32 |
| 2006/0265386 | A1 | 11/2006 | Richter et al. |
| 2007/0150415 | A1* | 6/2007 | Bundy ................. H04L 9/0866 705/51 |
| 2007/0268516 | A1* | 11/2007 | Bugwadia ........... H04L 41/0886 358/1.15 |
| 2008/0034110 | A1* | 2/2008 | Suganthi ............ H04L 63/0272 709/238 |
| 2008/0082381 | A1* | 4/2008 | Muller .................. G06Q 10/10 705/344 |
| 2008/0134018 | A1 | 6/2008 | Kembel et al. |
| 2009/0228973 | A1* | 9/2009 | Kumar ................ H04L 63/0272 726/15 |
| 2010/0281143 | A1 | 11/2010 | Krahn et al. |
| 2011/0125885 | A1* | 5/2011 | Joo ..................... H04L 41/0809 709/222 |
| 2011/0179136 | A1* | 7/2011 | Twitchell, Jr. ........ H04L 43/028 709/217 |
| 2012/0226739 | A1* | 9/2012 | Kim ..................... H04W 4/001 709/203 |
| 2013/0125107 | A1* | 5/2013 | Bandakka ........... G06F 11/1448 717/171 |
| 2014/0119279 | A1* | 5/2014 | Han ..................... H04W 48/16 370/328 |
| 2014/0220897 | A1* | 8/2014 | Wan .................... H04W 12/003 455/41.2 |
| 2014/0325041 | A1* | 10/2014 | Xu ..................... H04L 41/0816 709/221 |
| 2015/0081926 | A1* | 3/2015 | White ................. H04L 67/1008 709/245 |
| 2015/0149631 | A1* | 5/2015 | Lissack ............... H04L 41/5051 709/226 |
| 2015/0379167 | A1* | 12/2015 | Griffith ............... G06F 11/3442 703/22 |
| 2016/0003972 | A1* | 1/2016 | Angermann ........... G05B 15/02 702/5 |

OTHER PUBLICATIONS

Cimino et al., "An Efficient Model-Based Methodology for Developing Device-Independent Mobile Applications," Journal of Systems Architecture, Sep. 2012, vol. 58 (8), pp. 286-304.
Holocher et al., "MIDA: An Open Systems Architecture for Model-Oriented Integration of Data and Algorithms," Decision Support Systems, Jun. 1997, vol. 20 (2), pp. 135-147.
International Patent Application No. PCT/CA2014/000813, International Preliminary Report on Patentability dated May 18, 2017.
International Patent Application No. PCT/CA2014/000813, International Search Report and Written Opinion dated Aug. 5, 2015.
Macik, "User Interface Generator," Department of Computer Graphics and Interaction, Jan. 2011, 48 pages.
Tang et al., "Multi-Platform Mobile Thin Client Architecture in Cloud Environment," Procedia Environmental Sciences, 2011, vol. 11, pp. 499-504.

\* cited by examiner

METHOD AND SYSTEM FOR DYNAMICALLY CONFIGURING A CLIENT INSTALLED AND RUNNING ON A COMMUNICATION DEVICE

FIELD

The present disclosure generally relates to client-server networks. More particularly, the present disclosure relates to a method and system for configuring a client installed and running on a communication device based on the environment within which the client operates.

BACKGROUND

In client-server networks, a client is a computer program or software that accesses a service provided by a server through a network. A client resides on a communication device, such as, for example, a personal digital assistant (PDA), a mobile phone, a desktop computer, a laptop computer, or a tablet.

Presently, a client that accesses a service provided by a server can detect its location within a network by determining environment parameters, network parameters, or both, and, accordingly, the client can control, based on these parameters, which options of the service (hereinafter referred to as service options) the client provides to a user. That is, the client can enable or disable different service options that are provided by the client to a user based on environment parameters, network parameters, or both, by selecting a configuration that is preset in the client. For example, a client may have one preset configuration that configures the client to access the service through a wireless connection, such as WiFi or WiMax, and another preset configuration that configures the client to access the service through a cellular connection, such as 4G or LTE. The client, during initialization, such as when a user of the communication device logs into the client to access the service, may select one of these preset configurations and configure itself accordingly. When configuring itself, the client enables and disables different service options (e.g. network speed, security setting, etc.) provided by the client.

The preset configurations that can be selected by the client during initialization of the client are static and preset in the client software. Thus, when network settings change, i.e., when the hardware or software of the communication device or the location of the communication device changes, the static preset configurations that can be selected by the client are unable to dynamically adapt to these changes, and the client is likely to perform poorly or not at all.

Improvements in methods of configuring a client installed and running on a communication device are therefore desirable.

SUMMARY

The present disclosure provides a method and system for dynamically configuring a client installed and running on communication device as a function of the environment within which the client operates and the administrative constraints set by, for example, a network administrator.

In a first aspect, the present disclosure provides a computer-implemented method of dynamically configuring a client installed on a communication device. The method includes, at a server operationally connected to the client through a network: obtaining, from the client, environment identification data, the environment identification data identifying an environment in which the client operates; generating, as a function of the environment identification data and administrative constraints, a configuration for the client; and pushing, to the client, the configuration, the configuration for configuring the client to operate in the environment.

In another aspect, the environment identification data may be periodically obtained during operation of the client.

In another aspect, each time the environment identification data is obtained during operation of the client, a new configuration may be generated for the client as a function of the environment Identification data and administrative constraints.

In another aspect, the communication device includes a processor; and the environment identification data may include an identification of the processor.

In another aspect, the communication device has an operating system running thereon, and the environment identification data may include an identification of the operating system.

In another aspect, the communication device comprises firmware, and the environment identification data may include an identification of the firmware.

In another aspect, the communication device has a brand and a model, and the environment identification data may include an identification of the brand and of the model.

In another aspect, the communication device has a hardware platform interface, and the environment identification data may include an identification of the hardware platform interface.

In another aspect, the communication device has software running thereon, the environment identification data may include an identification of the software.

In another aspect, the environment identification data may include geographical location data of the communication device.

In another aspect, the geographical location data may be GPS coordinates of the communication.

In another aspect, the communication device has an Internet protocol (IP) address, the IP address having associated to a geographical region, and the geographical location data may include an identification of the geographical region.

In another aspect, the communication device has IP address data associated thereto, and the environment identification data may include the IP address data.

In another aspect, the IP address data may include an external IP address.

In another aspect, the IP address data may include an internal IP address.

In another aspect, the communication device is operationally connected to a Domain Name System (DNS) server, and the environment identification data may include an identification of the DNS server.

In another aspect, the communication device is operationally connected to a routing database, the routing database defining routes to connect the communication device to a target destination, and the environment identification data may include the routes.

In another aspect, the communication device is connected to a network, and the environment identification data may include an identification of the network.

In another, the communication device is connected to a network through a network connection, and the environment identification data may include parameters of the network connection.

In another, aspect, the network includes network elements each having a network element IP address, and the environment identification data may include at least one network element IP address.

In another, aspect, the network includes a network interface having a MAC address, and the environment identification data may include the MAC address.

In another, aspect, the network includes a WiFi network, the communication device and the WiFi network being operationally connected to each other by a WiFi signal, the WiFi signal having a WiFi signal strength, and the environment identification data may include the WiFi signal strength.

In another aspect, the network includes a cell network, the communication device and the cell network being operationally connected by a cell signal, the cell signal having a cell signal strength, and the environment identification data may include the cell signal strength.

In another aspect, the communication device is operationally connected to a Bluetooth™ device, and the environment identification data may include an identification of the Bluetooth™ device.

In another aspect, the communication device has associated thereto a user, and the environment identification data may include an identification of the user.

In another aspect, the present disclosure provides a computer-implemented method of dynamically configuring a client installed on a communication device. The method includes, at the client: obtaining, from the communication device, environment identification data, the environment identification data identifying an environment in which the client operates; and sending, to a server operationally connected to the client through a network, the environment identification data. The method also includes, at the sever: generating, as a function of the environment identification data and administrative constraints, a configuration for the client; and pushing, to the client, the configuration, the configuration for configuring the client to operate in the environment.

In another aspect, the environment identification data may be periodically obtained during operation of the client.

In another aspect, each time the environment identification data is obtained during operation of the client, a new configuration may be generated for the client as a function of the environment identification data and the administrative constraints.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Figure 1:
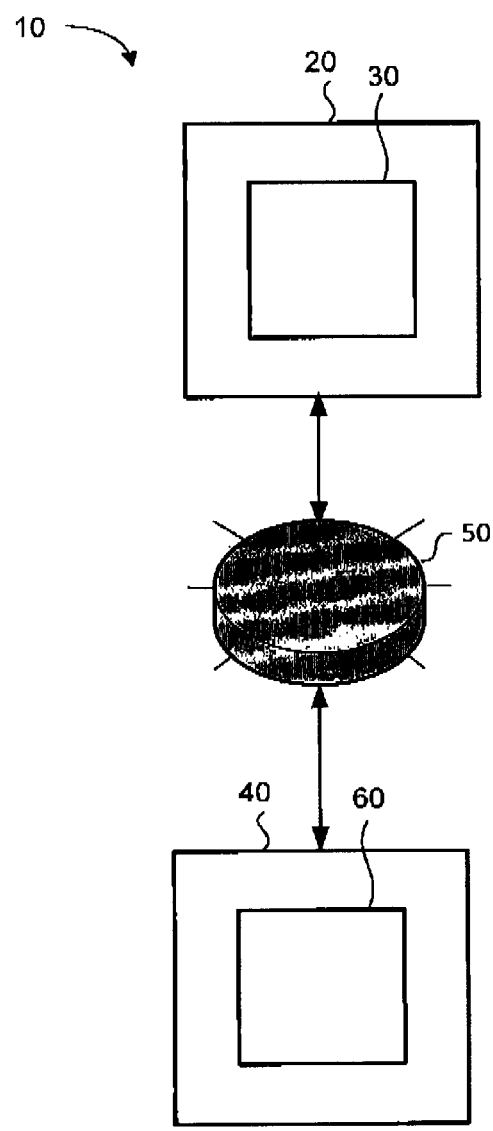
FIG. 1 is a block diagram of a system for configuring a client installed and running on a communication device in accordance with an example embodiment of the present disclosure.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Generally, the present disclosure relates to a method and system for configuring a client that is installed and running on a communication device based on the environment within which the client operates.

In the present disclosure, elements in a network can be said to be operationally connected to each other when, for example, information in one element can be communicated to another element through the network. Further, elements in a network can be said to be operationally connected when an action in, or a state of, one element can be controlled by, or related to, an action in, or a state of, another element.

Referring now to FIG. 1, a block diagram of a system for configuring a client installed and running on a communication device in accordance with an embodiment of the present disclosure is shown. The system 10 includes a communication device 20 on which a client 30 is installed and running, and a configuration server 40 that is operationally connected to the client 30 through the communication device 20 and a network 50. The configuration server 40 includes an intelligent agent 60, which is described in further detail below.

The communication device 20 is any suitable electronic device than can run the client 30 and communicate with the configuration server 40 through the network 50. Examples of a communication device 20 include a mobile phone, a smartphone, a personal digital assistant (PDA), tablets, a desktop computer, and a laptop computer. The client 30 is a computer program or software that provides a communication service to a user. In an embodiment, the client 30 is a computer program or software that provides video calling, voice calling, or instant messaging capabilities to a user using a voice over internet protocol (VoIP). In the video calling embodiment, the client 30 communicates with another client (not shown) through the network 50. The configuration server 40 is operationally connected to the client 30 for configuring the client 30 to enable communication with other clients (not shown) via the network 50.

The intelligent agent 60 generates configurations for the client 30 as described in further detail below. Each configuration generated by the intelligent agent 60 includes parameters or settings that the client 30 uses to configure itself.

Figure 2:
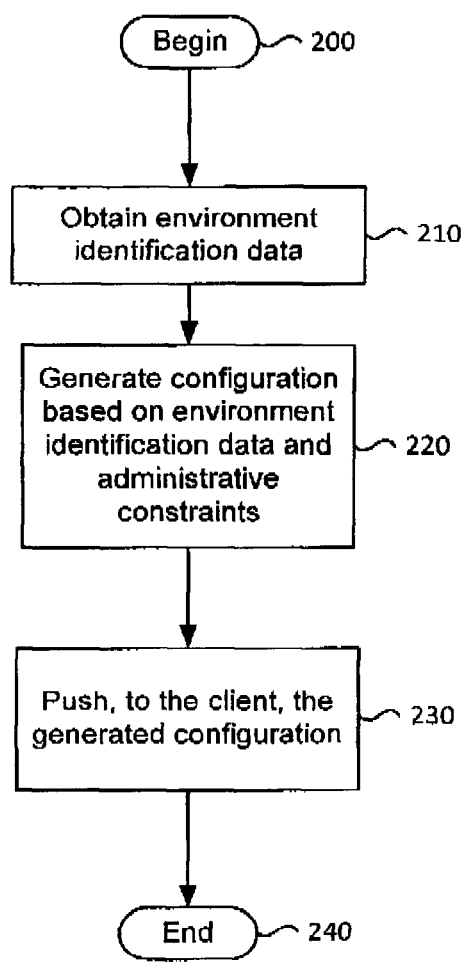
FIG. 2 is a flowchart illustrating a method of configuring a client installed and running on a communication device in accordance with an example embodiment of the present disclosure.

Referring now to FIG. 2, a flowchart of a method of configuring a client 30 installed on a communication device 20, in accordance with an embodiment of the present disclosure, is shown. The method may be carried out by software executed, for example by, a processor (not shown) of the configuration server 40. Coding of software for carrying out such a method is within the scope of a person of ordinary skill in the art given the present description. The method may contain additional or fewer processes than shown and/or described. Computer-readable code executable by the processor to perform the method may be stored in a non-transitory, tangible computer-readable medium that is operationally connected to the processor.

The method begins at 200 and then proceeds to action 210. At action 210, the configuration server 40 obtains, from the client 30, data related to the environment within which the client 30 operates. In an embodiment, the configuration server 40 obtains, from the client 30, data related to the environment, upon initialization of the client 30 (i.e., when a user logs into the client). In an alternative embodiment, the configuration server 40 obtains, from the client 30, data related to the environment during operation of the client 30. The data related to the environment in which the client operates is referred to as environment identification data. In an embodiment, the configuration server 40 obtains the environment identification data using the Hypertext Transfer Protocol (HTTP). In this embodiment, the environment identification data is formatted in accordance with the HTTP protocol and placed in the body of a POST (HTTP) request.

In an alternative embodiment, the configuration server 40 may obtain information about the client from a transmission control protocol (TCP wrapper) or from reports the client 30 has prepared with respect to sources, such as, for example, a Geo-IP lookup of the device's country or a Lookup of the carrier of record for an IP address. When such a report states that a carrier of record is located in a city/country that is far away where there may be a time-delay issue, this may affect the choice of the most suitable voice codec to use when generating a configuration for the client. As another example, when such a report states that a wireless carrier is used, NAT traversal may be more of a concern/issue in communicating with the client; this may affect an eventual choice of particular NAT traversal techniques when generating a configuration for the client. As a further example, when a client is associated with an enterprise, a report stating that the client is currently at the enterprise facility or outside the facility may affect the choice of security settings to apply to the client when generating a configuration of the client. As another example of a report, the configuration server may obtain a report that pertains to the voice quality monitoring (VQM) or analytics of a video/audio call made using the client. This may also affect the generation of a configuration for the client.

For the purposes of the present disclosure, the environment identification data can include, for example, data that Identifies the parameters of the hardware of the communication device 20, the parameters of the software installed on the communication device 20, parameters of the network 50 to which the communication device 20 is operationally connected (hereinafter referred to as network parameters), or parameters associated with the physical location at which the communication device 20 operates (hereinafter referred to as environmental parameters). In an embodiment, the environment identification data may not include parameters associated with the physical location at which the communication device 20 is located.

Examples of data that identifies the parameters of the hardware of the communication device 20 includes data that identifies the brand and/or the model number of the communication device 20, the brand and/or model of a processor in the communication device 20, the number of processors running in the communication device 20, the type and the number of data converters (e.g., audio codecs, video codecs) installed in the communication device 20, the brand of the communication hardware (including, e.g., the brand of a transceiver) installed in the communication device 20, any peripheral device operationally connected to the communication device 20 using, for example, Bluetooth™, an audio input device that is part of, or that is operationally connected to, the communication device 20, a video or image capture device that is part of, or that is operationally connected to, the communication device 20, the hardware platform interface of the communication device 20, the battery level of the communication device 20, etc.

Examples of data that identifies the parameters of the software installed on the communication device 20 includes data that identifies the operating system running on the communication device 20, the software and firmware, running on the communication device 20, including the versions of the software and firmware.

Examples of data that identifies parameters of the network 50 includes data that identifies the network 50 to which the communication device 20 is operationally connected, a type of connection between the communication device 20 and the network 50 (e.g. a wired connection such as Ethernet or wireless connection such as WiFi, 3G, 4G, LTE etc.) and the parameters of the connection, such as a signal strength of the wired or wireless signal. Data that identifies parameters of the network 50 can also include, for example, an external IP address of the communication device 20, an internal IP address of the communication device 20, or both, a Domain Name Server (DNS) to which the communication device 20 is operationally connected, a routing database of the network 50, the routes defined in the routing database, and the number of hops (network hops) between the communication device 20 and another client (not shown). Additionally, the data that identifies parameters of the network 50 can include a MAC address of any suitable device that is part of the network that operationally connects the communication device 20 to the network 50.

Examples of data that identifies parameters associated with the physical location in which the communication device 20 operates can include a geographical location of the communication device 20, the location of the cell in a cellular network to which the communication device 20 is connected as well as the location of one or more neighboring cells, the location of the access point of a WiFi hub to which the communication device is operationally connected, the location of near field communication system (NEC) or Bluetooth™ beacons to which the communication device 20 is operationally connected. In addition, data that identifies parameters associated with the physical location in which the communication device 20 operates can include data from the output of inertial sensors and data from the output of a barometric pressure sensor installed in the communication 20 or location. In an embodiment, a geographic location of the communication device 20 can be determined from the GPS coordinates of the communication device 20. The GPS coordinates of the communication device 20 can be obtained from a conventional GPS system, an assisted GPS system, or a synthetic GPS system, which uses GPS satellites forecast locations days or week in advance.

Referring again to FIG. 2, after obtaining the environment identification data from the client 30 at action 210, the method proceeds to action 220. At action 220, the intelligent agent 60 of the configuration server 40 retrieves administrative constraints or rules and generates a configuration for the client 30 based on, or as a function of, the obtained environment identification data and the administrative constraints or rules. The administrative constraints or rules are set by, for example, a network administrator and are stored in a memory of the configuration server 40.

For the purposes of the present disclosure, administrative constraints or rules may include user options for the service provided by the client 30, security clearance level of a user, access privileges corresponding to the physical location of the communication device 20 on which the client 30 is installed, version of the client software for use with a particular service, etc. For example, when a user has paid to access certain premium service options of the client 30, a network administrator may set the administrative constraints or rules such that the intelligent agent 80 generates a configuration that provides access to the premium service options. Also, when the communication device 20 is in a particular office of a company or when the user of the communication device 20 meets or does not meet a certain security clearance level, the intelligent agent 60 may generate a configuration accordingly.

Subsequent to generating a configuration at action 220, the method proceeds to action 230. At action 230, the configuration server 40 pushes the configuration that was generated at the configuration server 40, to the communication device 20 via the network 50, and in turn the communication device 20 pushes the configuration that is received from the configuration server 40 to the client 30. In an embodiment, the configuration server 40 generates a text file that includes the configuration and pushes the text file to the client 30. In an alternative embodiment, when the communication device 20 is a desktop or laptop computer, the configuration server 40 may also push binary files to the client 30 that define new service options for the client 30. For example, the configuration server may push a binary plug-in that can be loaded dynamically and installed into the client 30 as an extension to enable the client 30 to provide the new service options.

Upon receipt of the configuration from the communication device 20, the client 30 configures itself based on the received configuration.

An example of a configuration generated by the intelligent agent 60 will now be described. In this example, the configuration server 40 has obtained the following environment identification data from the client 30:

data that identifies that the user is a member of a particular enterprise and data that identifies that the user has downloaded installed the client 30 on the communication device 20;

data that identifies the communication device 20 as a smart phone device;

data that identifies the version of the client 30;

data that identifies the operating system of the smart phone;

data that identifies the version of the operating system;

data that identifies the hardware version of the smart phone (in this example, the data identifies that the hardware version is version 3 rather than the latest hardware version 5);

data that identifies that the smart phone on which the client 30 is running is connected using a wireless connection, such as a long-term evolution (LTE) connection; and data that identifies that the client 30 is located in Spain.

In this example, the administrative constraints or rules are:

the administrator has chosen that all clients, no matter the type or network, should only ever use the audio codec G.711 and the video codec H.264; and for this enterprise, the administrator has chosen that older models of smart phones should not use more advanced codecs.

Thus, the intelligent agent 60 of the configuration server 40 generates a configuration based on, or as function of, the environment identification data and the administrative factors noted above. The configuration sever 40 pushes the generated configuration to the client 30 running on the smart phone, and the client 30 uses the parameters in the configuration to configure itself. The configuration that is generated by the intelligent agent 60 includes parameters or settings that inform the client 30 to use the audio codec G.711 and the video codec H.264 of the smart phone, and parameters or settings that enable the client 30 to use more bandwidth with lower quality than what a newer device (version 5) would receive.

In an embodiment, the client 30 may install any new binary items, may activate new features such as enabling a codec of the communication device, turn on session initiation protocol (SIP) presence in the communication device 20, or activate a virtual private network (VPN) for the client 30. In another embodiment, after the client 30 configures itself based on the configuration received from the configuration server 40, the client 30 may restart itself. In an alternative embodiment, the client 30 may disconnect and reconnect to servers connected to the network 60 to broadcast its new capabilities.

The configuration server 40 that pushes the generated configuration pre-supposes that the client 30 has all the configurable options or functionalities addressed by the configuration. In another embodiment, the configuration server 40 pushes not only the configuration that the intelligent agent 60 generates, but also binary files that define new functions of the client 30.

Figure 3:
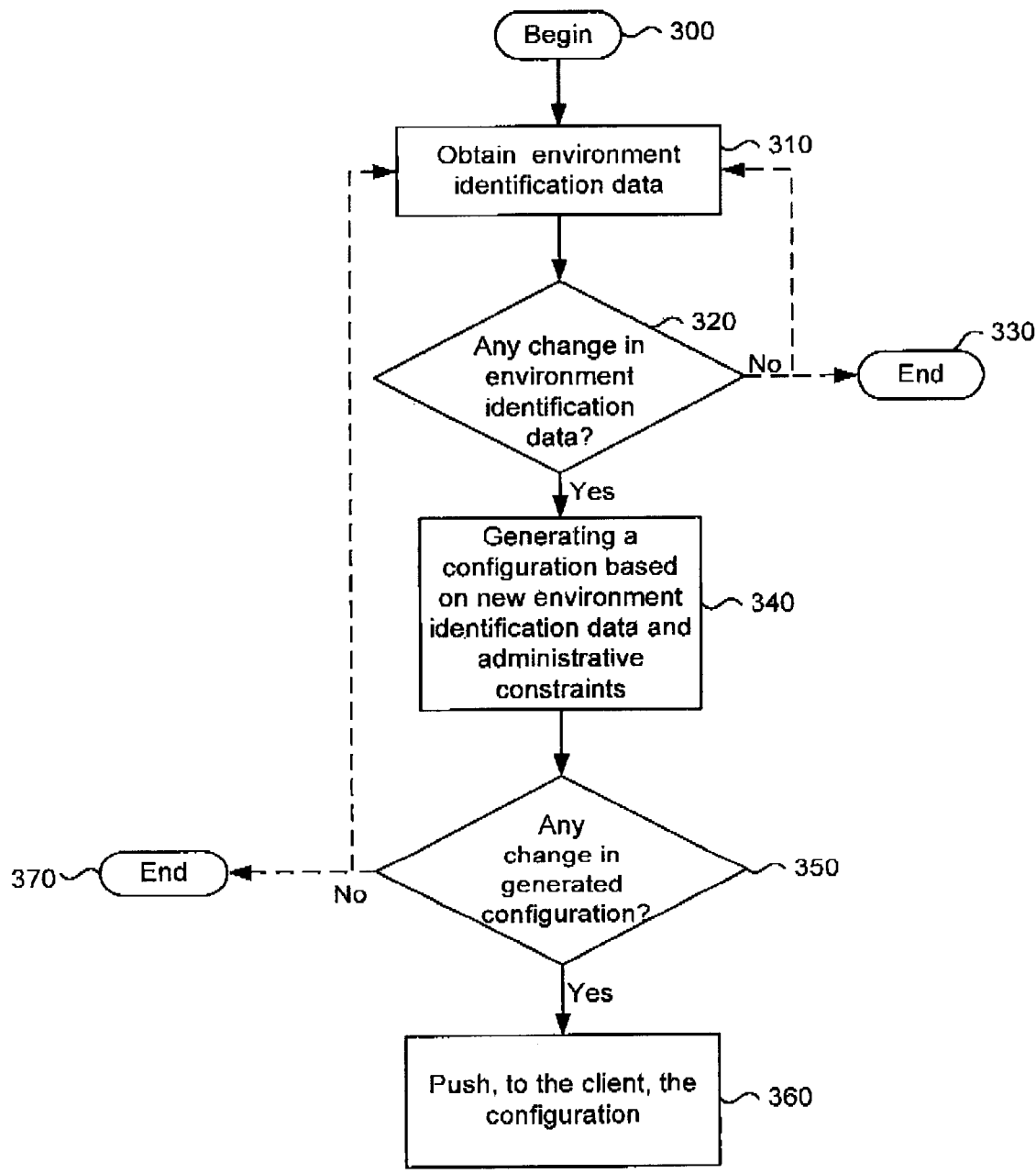
FIG. 3 is a flowchart a method of configuring a client installed and running on a communication device in accordance with another example embodiment of the present disclosure.

FIG. 3 shows a flowchart of a method of configuring a client installed on a communication device in accordance with another embodiment of the present disclosure. The method begins at 300 and proceeds to action 310. At action 310, the configuration server 40 obtains, from the client 30, data related to the environment in which the client operates, i.e., environment identification data. After the environment identification data is obtained at action 310, the method proceeds to 320.

At action 320, the configuration server 40 determines whether there has been a change in the environment identification data. When the configuration server 40 determines that there has been no change in the environment identification data, the method proceeds to action 330 and ends or, alternatively, the method can loop back to action 310. In an embodiment, there can be a predetermined time delay between actions 310 and 320. The predetermined time delay can be any suitable time duration in which the client periodically obtains environment identification data to determine if configuration changes are warranted. When the configuration server 40 determines that there has been a change in the environment identification data obtained from the client 30, the method proceeds from action 320 to action 340. At action 340, the intelligent agent 60 generates a new configuration based on the new environment identification data and the administrative constraints or rules set by a network administrator and stored in a memory on the configuration server 40. The method proceeds to action 350.

At action 350, the configuration server 40 determines whether the new configuration that is generated by the intelligent agent 60 at action 340 is different from a previous configuration generated by the intelligent agent 60 and pushed to the client 30. In this embodiment, the configuration server 40 can receive and store a record of the previous configuration generated and pushed to the client 30 at the time the environment identification data is obtained at action 310. In an alternative embodiment, the configuration server 40 may simply keep a record of the last configuration pushed to the client 30. When the configuration server 40 determines that the new configuration that is generated by the intelligent agent 60 is different from the previously generated configuration by the intelligent agent 60, the method proceeds to action 360. At action 360, the configuration server 40 pushes the new configuration to the communication device 20 via the network 50, and in turn the communication device 20 pushes the new configuration to the client 30. Upon receipt of the new configuration from the communication device 20, the client 30 configures itself based on the new configuration.

When the configuration server 40 determines that the new configuration generated by the intelligent agent 60 is the same as the configuration previously generated by the intelligent agent 60 at action 340, the method proceeds to action 370 and ends, or alternatively, loops back to action 310 with or without being subjected to a predetermined time delay.

As can be understood by the flowchart of FIG. 3, in some scenarios, a change in the environment identification data does not warrant a change in the configuration of the client 30. That is, the intelligent agent 60 of the configuration server 40 may generate the same configuration for different sets of environment identification data and administrative constraints or rules.

In the present disclosure, the environment identification data affects the configuration of the client 30 and the service options provided to a user. For example, when the communication device 20 has multiple audio codecs and multiple video codecs, the configuration server 40 receives environment identification data from the client 30, which data identifies the multiple audio and the multiple video codecs of the device, the intelligent agent 60 of the configuration server 40 generates a configuration based on, for example, the type of network to which the communication device is operationally connected. The configuration generated by the intelligent agent 60 includes parameters or setting that the client 30 utilizes to configure itself to use one video codec and one audio codec amongst the multiple audio and the multiple video codecs to configure the client.

In a further example, the environment identification data includes data that identifies parameters of the network 50. The data that identifies parameters of the network 50 can Include, for example, data that identifies network health (latency, throughput, media consistency, jitter), data that identifies availability of external IP addresses and/or data that identifies different internet service providers (ISPs) using different types of network connection technologies such as DSL or dial up, etc. Specifically, when the strength of a wireless signal (WiFi or cellular) connecting the communication device 20 to the network 50 is weak, the intelligent agent 60 can generate a configuration that provides a reduced set of service options to a user of the client 30 in order not to over-stress the weak connection. Further examples of data that identifies parameters of the network 50 that may affect the generation of the configuration by the intelligent agent 60 include local gateway latency, multi-hop latency, network routing between the client and the configuration server, round-trip-time for sending data between the client 30 and the gateway interface type for local connection (WiFi, Ethernet, Bluetooth, etc.).

In a further example, the environment identification data can include data that identifies the physical location of the communication device 20, which can affect the service options that can be provided to the user by the client 30. For example, when the location or approximate location of the communication device 20 is determined to be in a country where eavesdropping on communications is common, the intelligent agent 60 of the configuration server 40 generates a configuration that the client 30 utilizes to configure itself to encrypt outgoing communications. The intelligent agent 60 may also generate a configuration which the client 30 utilizes to configure itself to use, for example, secured HTTPS port 443 instead of unsecured HTTP port 80. Further, the intelligent agent 60 may generate a configuration that the client 30 utilizes to configure itself to use a virtual private network (VPN).

Figure 4:
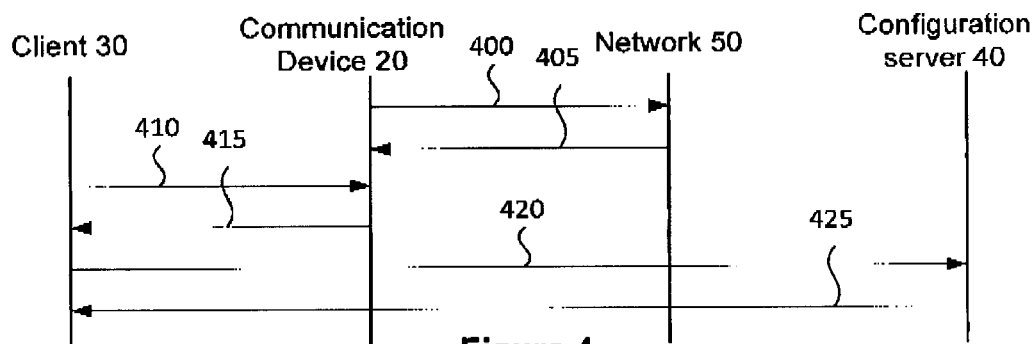
FIG. 4 is a data sequence diagram in accordance with an embodiment of the present disclosure.

FIG. 4 shows an example of a data sequence diagram showing the flow of environment identification data and a configuration between a client 30 and a configuration server 40 in accordance with an embodiment of the present disclosure.

When the communication device 20 is activated by a user, the communication device 20 connects to the network 50 through any suitable known process at 400. In doing so, the communication device 20, at 405, acquires an IP address, identifies the network 50 to which the communication device 20 is connected, and identifies the type of connection between the communication device 20 and the network 50. In the present example, the communication device 20 connects to the network 50 using a WiFi connection.

In the present embodiment, the communication device 20 stores in a memory the acquired IP address, the data that identifies the network 50, data that identifies the connection as being a WiFi connection, data that identifies the signal strength of the WiFi connection as environment identification data. The communication device 20 also stores in memory further environment identification data such as, for example, data that identifies a subscriber identity number (SIN) associated with the communication device 20, data that identifies the operating system installed and running on the communication device 20, and data that identifies the firmware installed and running on the communication device 20.

When a user logs into the client 30, the client 30 is activated and the client 30 sends a request 410 to the communication device 20 for the environment identification data stored on the communication device 20. In response to receipt of the request 400. the communication device 20 sends 415 the environment identification data stored thereon to the client 30. In response to receipt of the environment identification data, the client 30 then sends 420 the environment identification data to the configuration server 40, via the communication device 20 and the network 50.

When the client 30 sends the environment identification data, the configuration sever 40 obtains the environment identification data from the client 30. Upon obtaining the environment identification data from the client 30, the intelligent agent 60 of the configuration server 40 generates a configuration based on, or as a function of, the obtained environment identification data and the administrative constraints or rules set by, for example, a network administrator.

Upon generating a configuration, the configuration server pushes 425 the configuration, via the network 50 and the communication device 20, to the client 30. In response to receipt of the configuration pushed 425 from the configuration server 40, the client 30 configures itself based on received configuration.

In an alternative embodiment, the configuration server 40 may periodically obtain new environment identification data to the client 30 during operation of the client. Upon receipt of the new environment identification data, the intelligent agent 60 of the configuration server 40 generates a new configuration based on, or as a function of, the new environment identification data, and the administrative constraints or rules. Upon generating the new configuration, the configuration server pushes 415 the new configuration, via the network 50 and the communication device 20, to the client 30. In response to receipt of the new configuration pushed 425 from the configuration server 40, the client 30 configures itself based on the new configuration.

In an alternative embodiment, the configuration server 40 may obtain (e.g., the client may periodically update the configuration server) a change in the environment identification data and the intelligent agent 60 of the configuration server 40 may generate a new configuration based on the new environment identification data and the administrative constraints or rules. Upon generating the new configuration, the configuration server 40 pushes 425 the new configuration to the client 30, which configures itself based on the new configuration.

Advantageously, the method of the present disclosure dynamically generates configurations for the client as environment identification obtained from the client 30 changes during operation of the client 30.

Figure 5:
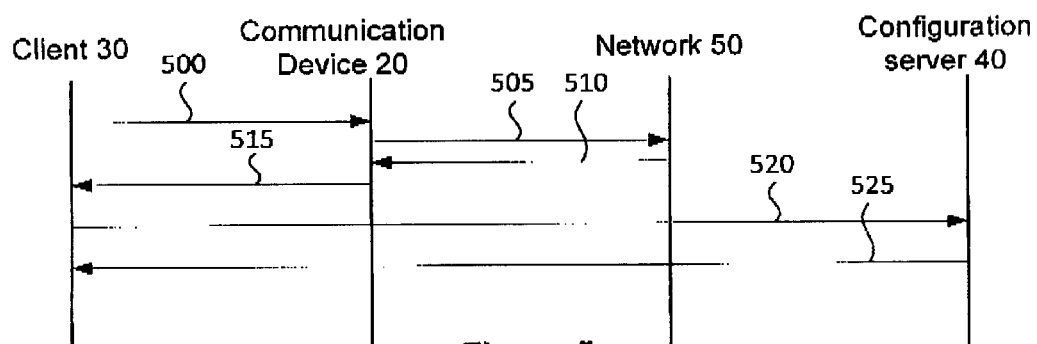
FIG. 5 is a data sequence diagram in accordance with another embodiment of the present disclosure.

FIG. 5 shows another example of a data sequence diagram showing the flow of environment identification data and a configuration between a client 30 and a configuration server 40 in accordance with an embodiment of the present disclosure.

The method begins with the client 30 sending a request 500 to the communication device 20 for environment identification data. The client 30 sends the request 500 when a user logs into the client 30 or periodically during operation of the client 30. In response to receipt of the request 500, the communication device 20 sends a request 505 to the network 50 for data that identifies network parameters. In response to the receipt of the request 505 from the communication device 20, the network 50 sends 510 environment identification data to the communication device 20. In the present embodiment, the environment identification data includes data that identifies parameters of the network 50 to which the communication device 20 is connected. The data that identifies parameters of the network 50 include, for example, data that identifies the network 50, data that identifies the number of hops between the network 50 and the configuration server 40, data that identifies the local/private external IP address, data that identifies the type of connection type for the communication device 30 (WiFi or Ethernet), data that identifies the cell within which the communication device 20 operates, data that identifies the time zone the communication device 20 is in, data that identifies the wireless SSID, data that that identifies the signal strength of the connection, data that identifies the ping time to a particular network destination, data that identifies the IP speed test information, data that identifies whether the communication device 20 can reach the private SIP interface of a phone system, and data that Identifies whether the communication device 30 can a VPN concentrator.

In response to receipt of the environment Identification data that identifies the parameters of the network 50, the communication device 20 combines the environment identification data received from the network 50 with further environment identification data stored in a memory of the communication device 20. The environment identification data stored in memory includes, for example, data that identifies parameters of the hardware of the communication device 20, data that identifies the parameters of the software installed on the communication device 20, and optionally, data that identifies a physical location of the communication device 20, to form the environment identification data. The communication device 20 then sends 515 the combined environment identification data to the client 30.

In response to receipt of the combined environment identification data from the client 30, the client 30 then sends 520 the combined environment identification data to the configuration server 40, via the communication device 20 and the network 50.

When the client 30 sends the combined environment identification data, the configuration sever 40 obtains the combined environment identification data from the client 30. Upon obtaining the combined environment identification data from the client 30, the intelligent agent 60 of the configuration server 40 generates a configuration based on, or as a function of, the obtained combined environment identification data and the administrative constraints or rules set by, for example, a network administrator.

Upon generating a configuration, the configuration server pushes 525 the configuration, via the network 50 and the communication device 20, to the client 30. In response to receipt of the configuration pushed 525 by the configuration server 40, the client 30 configures itself based on the configuration.

Figure 6:
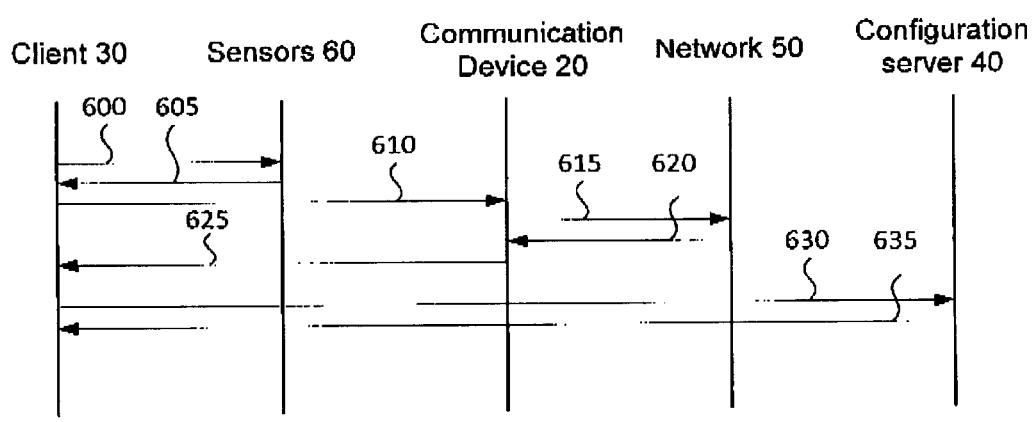
FIG. 6 is a data sequence diagram in accordance with another embodiment of the present disclosure.

FIG. 6 shows another example of a data sequence diagram showing the flow of environment identification data and a configuration between a client 30 and a configuration server 40 in accordance with an embodiment of the present disclosure.

In the embodiment shown in FIG. 6, the communication device 20 includes sensors for obtaining data that identifies parameters associated with the physical location at which the communication device 20 operates. The communication device 20 includes inertial sensors 60 such as a gyroscope, a magnetometer (a compass), and an accelerometer, a barometric pressure sensor, a GPS system, each of which provides data that identifies parameters associated with the physical location in which the communication device 20 operates.

In present embodiment, the client 30 sends a request 600 to the sensors 60 for environment identification data. In the present embodiment, the client 30 sends the request 600 to the sensors 60 for environment identification data that includes data that identifies parameters associated with the physical location in which the communication device 20 operates. The clients may send the request 600 to the sensors 60 when the client 30 is activated by a user logging into the client 30 or periodically during operation of the client 30.

In response to receipt of the request 600 from the client 30, the sensors 60 provide 605 environment identification data to the client 30, which includes data that identifies parameters associated with the physical location in which the communication device 20 operates.

Also, either when the client 30 is activated or periodically during operation of the client 30, the client 30 sends a request 610 to the communication device 20 for environment identification data. In response to receipt of the request 610, the communication device 20 sends a request 615 to the network 50 for environment identification data that includes data that identifies network parameters. In response to receipt of the request 615 from the communication device 20, the network 50 sends 620 environment identification data that includes data that identifies the network parameters of the network 50 to which the communication device 20 is connected. The network parameters include, for example, data that identifies the network 50, the number of hops between the network 50 and the configuration server 40.

In response to receipt of environment identification data from the sensors 60 and environment identification data from the network 50, the communication device 20 combines the environment identification data received from both the sensors 60 and the network with further environment identification data stored in, for example, memory of the communication device, and sends 625 the combined environment identification data to the client 30. In the present embodiment, the further environment identification data includes data that identifies parameters of the hardware of the communication device, data that identifies the parameters of the software installed on the communication device 20.

In response to receipt of the environment identification data from the communication device 20, the client 30 sends 630 the combined environment identification data to the configuration server 40 via the communication device 20 and the network 50.

When the client 30 sends the combined environment identification data, the configuration sever 40 obtains the combined environment identification data from the client 30. Upon obtaining the combined environment identification data from the client 30, the intelligent agent 60 of the configuration sewer 40 generates a configuration based on the obtained combined environment identification data, the technical factors associated with the network, and the administrative constraints or rules set by, for example, a network administrator.

Upon generating a configuration, the configuration server pushes 635 the configuration, via the network 50 and the communication device 20, to the client 30. In response to receipt of the configuration pushed 635 from the configuration server 40, the client 30 configures itself based on the configuration.

In an embodiment, the configuration server 40 can obtain the environment identification data from the client 30 using any suitable type of application layer information transfer procedure such as, for example, the hypertext transfer protocol (HTTP). For example, the configuration server can send a POST (HTTP) request with "attribute=??" in the body and, in return, receive the environment identification data. Desktop clients may place this on the command line or attribute in body of POST, including JSON, XML, key value pair, etc. and at any suitable time over the lifecycle of the client. For example, when the communication device 20 is a portable electronic device, the configuration server 40 can obtain environment identification data once when the client 30 is initialized for the first time, at startup each time the client is launched, when the client 30 is in the process of exiting, after network events such as change of transport (UDP, TCP, 3G, WiFi, 4G), change of IP address, change of interface availability, change of quality of interface type (e.g. Ethernet vs WiFi vs Bluetooth™) at communication events, at device related events such as a connection on USB, or connection to mains charger, plugin of a headset, headset type, upon a change of location (physical or network-wise) of the communication device 20, etc.

In an alternative embodiment, the configuration pushed by the configuration server 40 can also include parameters or settings to activate a module already contained within the client 30. In addition to the configuration, the configuration server 40 can provide the client 30 with additional software modules that allow the client 30 to enable new or different service options. The configuration server 40 can provide the client 30 with a configuration that has parameters or settings for enabling the client 30 to configure itself for Transport Layer Security (TLS), Secure Real-Time Transport Protocol features, Session Initiation Protocol (SIP) port configuration, Tunneling Service Module (TSM) tunneling enablement, etc.

Communications clients are often customized to work with particular platforms. In non-ideal situations clients only operate against a particular brand/model/vendor specific implementation of a communications platform or network topology, network configuration, or other environmental factor. Communications clients built with the ideas embodied in the present disclosure are more flexible. They can contain a base set of features and functions that would, for example, work across common sets of communications platforms. They can also contain loadable, configurable, or downloadable component modules that enhance the feature and functions contained within the client or modify the features, functions, or components of the client to make it work or interoperate with specific communications server platforms. These modules can be complete features/functions. These modules can be modifications to signaling stacks or existing functions. These modules can be user interface components. These modules can be independent of user interface such that similar features which are implemented in disparate manners are presented to the user in a unified way despite the communications platform's implementation.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which; when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

The invention claimed is:

1. A computer-implemented method of dynamically configuring a client installed on a communication device, the method comprising, at a server operationally connected to the client through a network:

obtaining, from the client, an identification of a type of connection between the communication device and the network to obtain an identified type of connection, and parameters of the identified type of connection, the client having configurable options, the identified type of connection being one of a wired connection and a wireless connection;

generating, as a function of the identified type of connection obtained from the client, as a function of the parameters of the identified type of connection, and as a function of administrative constraints, a configuration for the client, the configuration identifying which configurable options the client is to select to operate with the identified type of connection and with the parameters of the identified type of connection; and pushing, to the client, the configuration, the configuration to cause the client to select the configurable options identified in the configuration.

2. The method of claim 1, wherein obtaining comprises periodically obtaining the identification of the type of connection to obtain an updated type of connection and the parameters of the updated type of connection, during operation of the client.

3. The method of claim 2, wherein generating comprises, each time the type of connection and the parameters of the identified type of connection are obtained during operation of the client, determining if a change in the identified type of connection or in the parameters of the identified type of connection have occurred; and, when there has been a change in the identified type of connection or in the parameters of the identified type of connection, generating a new configuration for the client as a function of the change in the identified type of connection or the change in the parameters of the identified type of connection and the administrative constraints.

4. The method of claim 1, further comprising, at the server:
obtaining, from the client, an identification of a processor running on the communication device, wherein generating the configuration for the client is also a function of the identification of the processor.

5. The method of claim 1, further comprising, at the server:
obtaining, from the client, an identification of an operating system running on the communication device, wherein generating the configuration for the client is also a function of the identification of the operating system.

6. The method of claim 1, further comprising, at the server:
obtaining, from the client, an identification of firmware running on the communication device, wherein generating the configuration for the client is also a function of the identification of the firmware.

7. The method of claim 1, further comprising, at the server:
obtaining, from the client, an identification of a brand and a model of the communication device, wherein generating the configuration for the client is also a function of the identification of the brand and the model.

8. The method of claim 1, further comprising, at the server:
obtaining, from the client, an identification of a hardware platform interface of the communication device, wherein generating the configuration for the client is also a function of the identification of the hardware platform interface.

9. The method of claim 1 further comprising, at the server:
obtaining, from the client, an identification of software running on the communication device, wherein generating the configuration for the client is also a function of the identification of the software.

10. The method of claim 1 further comprising, at the server:
obtaining, from the client, geographical location data associated to a geographical location of the communication device, wherein generating the configuration for the client is also a function of the geographical location data.

11. The method of claim 9 wherein the geographical location data includes GPS coordinates of the communication device.

12. The method of claim 11 wherein:
the communication device has an internet protocol (IP) address, the IP address having associated thereto a geographical region; and
the geographical location data includes an identification of the geographical region.

13. The method of claim 1 further comprising, at the server:
obtaining, from the client, an identification of an IP address associated to the communication device, wherein generating the configuration for the client is also a function of the identification of the IP address.

14. The method of claim 13 wherein the IP address data includes an external IP address.

15. The method of claim 13 wherein the IP address data includes an internal IP address.

16. The method of claim 1 wherein:
the communication device is operationally connected to a Domain Name System (DNS) server, the method further comprising, at the server:
obtaining, from the client, an identification of the DNS server, wherein generating the configuration for the client is also a function of the identification of the DNS server.

17. The method of claim 1 wherein:
the communication device is operationally connected to a routing database, the routing database defining routes to connect the communication device to a target destination, the method further comprising, at the server:
obtaining, from the client, an identification of the routing database, wherein generating the configuration for the client is also a function of the identification of the routing database.

18. The method of claim 1 wherein:
the network includes network elements each having a network element IP address, the method further comprising, at the server:
obtaining, from the client, at least one network element IP address, wherein generating the configuration for the client is also a function of the identification of the at least one network element IP address.

19. The method of claim 1 wherein:
the network includes a network interface having a MAC address, the method further comprising, at the server:
obtaining, from the client, an identification of the MAC address, wherein generating the configuration for the client is also a function of the identification of the MAC address.

20. The method of claim 1 wherein:
the network includes a WiFi network, the communication device and the WiFi network being operationally connected to each other by a WiFi signal, the WiFi signal having a WiFi signal strength; and
the parameters of the connection include the WiFi signal strength.

21. The method of claim 1 wherein:
the network includes a cell network, the communication device and the cell network being operationally connected by a cell signal, the cell signal having a cell signal strength; and the parameters of the connection include the cell signal strength.

22. The method of claim 1 wherein:
the communication device is operationally connected to a Bluetooth™ device, the method further comprising, at the server:
obtaining, from the client, an identification of the Bluetooth™ device, wherein generating the configuration for the client is also a function of the identification of the Bluetooth™ device.

23. The method of claim 1 wherein:
the communication device has associated thereto a user, the method further comprising, at the server:
obtaining, from the client, an identification of the user, wherein generating the configuration for the client is also a function of the identification of the user.

24. A computer-implemented method of dynamically configuring a client installed on a communication device configured for connection to a network, the method comprising:
at the client:
obtaining, from the communication device, an identification of a type of connection between the communication device and the network to obtain an identified type of connection, and parameters of the identified type of connection, the client having configurable options, the identified type of connection being one of a wired connection and a wireless connection; and
sending the identified type of connection and the parameters of the identified type of connection to a server operationally connected to the client through the network;
and
at the server:
generating, as a function of the identified type of connection obtained from the client, as a function of the parameters of the identified type of connection, and as a function of administrative constraints, a configuration for the client, the configuration identifying which configurable options the client is to select to operate with the identified type of connection identified by the client and with the parameters of the identified type of connection; and
pushing, to the client, the configuration, the configuration to cause the client to select the configurable options identified in the configuration.

25. The computer-implemented method of claim 24, wherein obtaining comprises periodically obtaining the identification of the type of connection to obtain an updated type of connection and the parameters of the updated type of connection, during operation of the client.

26. The method of claim 25, wherein generating comprises, each time the type of connection and the parameters of the identified type of connection are obtained during operation of the client, determining if a change in the identified type of connection or the parameters of the identified type of connection has occurred; and, when there has been a change in the identified type of connection or the parameters of the identified type of connection, generating a new configuration for the client as a function of the change in the identified type of connection or the change in the parameters of the identified type of connection, and the administrative constraints.

27. The method of claim 24, wherein the parameters of the type of connection include a signal strength of the wired connection when the type of connection is a wired connection and a signal strength of the wireless connection when the type of connection is a wireless connection.

* * * * *